No. 790,761. PATENTED MAY 23, 1905.
J. P. TAYLOR.
MOISTENING AND SPRINKLING ATTACHMENT FOR BROOMS.
APPLICATION FILED MAR. 28, 1904.
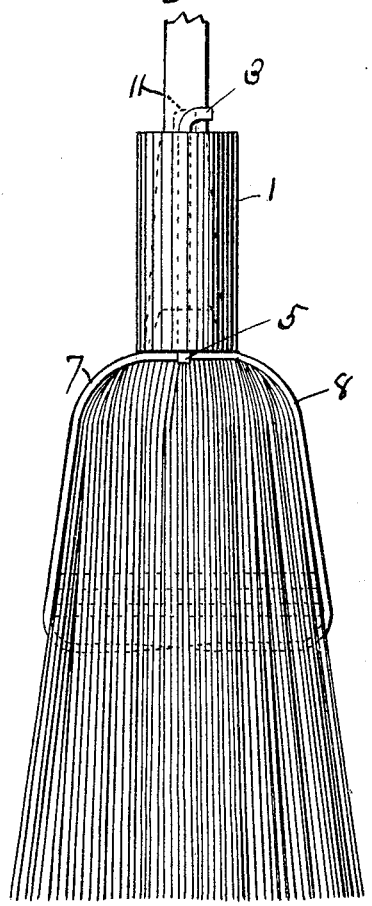
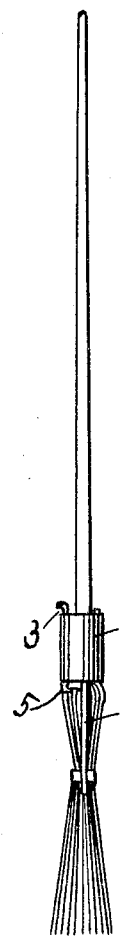
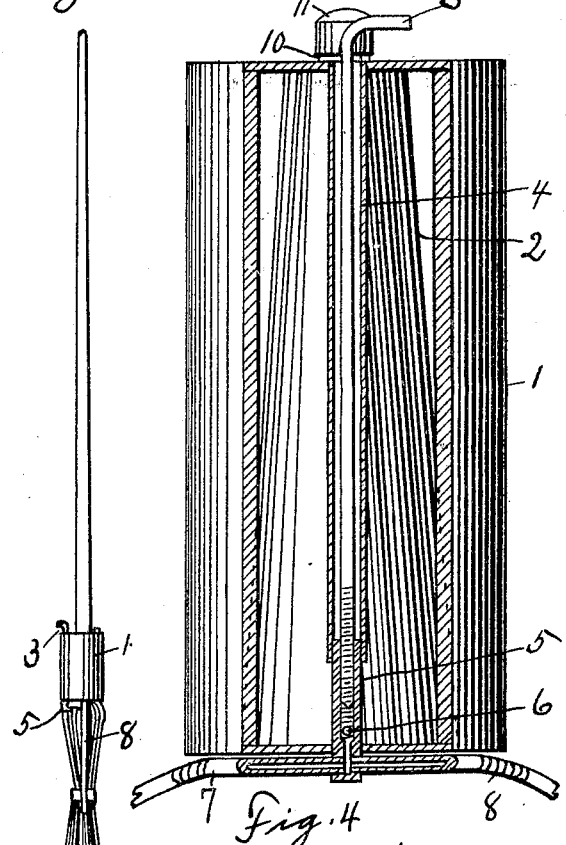
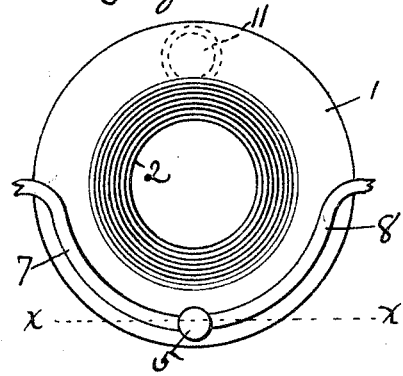
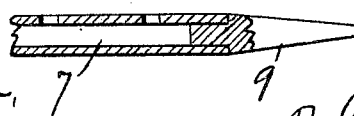
Witnesses:
D. A. Whisenant
Jack Robinson
Inventor,
J. P. Taylor,
By A. L. Jackson,
Attorney No. 790,761. Patented May 23, 1905.

UNITED STATES PATENT OFFICE.

JAMES P. TAYLOR, OF FORT WORTH, TEXAS, ASSIGNOR TO W. S. CARSON, OF CHICAGO, ILLINOIS.

MOISTENING AND SPRINKLING ATTACHMENT FOR BROOMS.

SPECIFICATION forming part of Letters Patent No. 790,761, dated May 23, 1905.

Application filed March 28, 1904. Serial No. 200,499.

*To all whom it may concern:*

Be it known that I, JAMES P. TAYLOR, a citizen of the United States, residing at Fort Worth, Texas, have invented certain new and useful Improvements in Moistening and Sprinkling Attachments for Brooms, of which the following is a specification.

This invention relates to attachments for brooms; and the object is to provide an attachment for brooms by which the brooms may be moistened constantly while in use and by which the dust is prevented from rising from the floor or other place and falling on goods or furniture or other articles.

One object is to provide means for regulating the flow of liquid to supply more or less liquid, as may be needed, so that the device is readily convertible into a sprinkling attachment.

Another object is to provide such attachment which will be convenient for carrying a quantity of water or other liquid on the broom in position for moistening or sprinkling at will.

Other objects are to provide such attachment so that it will be compact and easily carried on the broom and to produce such attachment at small cost, so that it will be economical to use.

Other objects and advantages will be fully explained in the following description, and the invention will be more particularly pointed out in the claim.

Reference is had to the accompanying drawings, which form a part of this application and specification.

Figure 1 is a side elevation of a broom provided with one of the moistening and sprinkling attachments, the broom-handle being broken away. Fig. 2 is an edge view of the same. Fig. 3 is a vertical section of the attachment along the line $x\ x$ of Fig. 4. Fig. 4 is a bottom plan view, the sprinkling-tubes being broken away. Fig. 5 is a broken section of one of the sprinkling-tubes, showing the perforations and plug for closing the end of the tube.

Similar characters of reference indicate the same parts throughout the several views.

This invention consists of a reservoir 1 for holding a liquid for sprinkling and moistening purposes and means for distributing the liquid as may be desired. The reservoir 1 is perforated from end to end, so that it can be placed on a broom-handle. This perforation is outlined in Fig. 1 and shown in Fig. 4. This perforation is closed on the interior by a funnel-shaped tube 2, so that the broom-handle will not come in contact with the liquid. The reservoir 1 is provided with a valve 3 for regulating the amount of liquid to be delivered on the broom or in the broom. This valve 3 extends through a tube 4 in the reservoir 1, which tube extends near the bottom of the reservoir. The tube 4 is connected to the interior of the top of the reservoir and constitutes a casing for the valve-stem. This casing also forms an efficient means for preventing the escape of oil or other liquid from the reservoir if the broom from any cause is thrown down in a horizontal position or the lower end of the broom elevated. A smaller tube 5 is inserted in the lower end of the reservoir. The valve 3 has the lower end thereof threaded, and the interior of the tube 5 is threaded to receive the valve 3. The tube 5 is perforated at 6 to receive fluid from the reservoir. The opening in the tube 5 below the perforation 6 is smaller than above that perforation, so that the valve 3 may be screwed down a short distance below the perforation 6 and close the opening in tube 5 to stop the flow of liquid whenever necessary. The liquid may be started again by turning the valve 3 backward until the same is screwed above the perforation 6. The tube 5 extends slightly below the reservoir 1.

Just below the reservoir 1 two small tubes 7 and 8 connect with the tube 5 for the purpose of delivering the liquid from the reservoir 1 to the broom. The tubes 7 and 8 extend down the edges of the broom to points approximately at the middle of the broom and are then bent and extended horizontally within the broom to points near the central part of the broom. The horizontal portions of the tubes 7 and 8 are perforated on the upper sides of the same to let the liquid out among the strands of the broom, and the object of having the perforations on the upper side of the tubes is to cause a more thorough distribution of the liquid. From the tube 5 the tubes 7 and 8 are curved far enough about the bottom of reservoir 1 to bring these tubes to each edge of the broom. The tubes 7 and 8 may be soldered to the bottom of the reservoir 1 for convenience in supporting the tubes. The ends of the tubes 7 and 8 are closed by pointed plugs 9, the plugs being pointed so that the tubes will be easily inserted in the broom. Liquid may be put in the reservoir 1 through the mouth 10, which is closed by a screw-cap 11, or the valve 3 may be left open and the device immersed in the liquid. For moistening purpose the perforated portions of the tubes 7 and 8 are preferably inserted in the broom, as shown in Fig. 2 and Fig. 1; but for sprinkling purposes the perforated portions of the tube may be placed on the outside of the broom, so that in sweeping the liquid may be thrown on the floor in the direction of the sweeping. Oil and water have been found to be efficient for moistening and sprinkling with this attachment.

Having fully described my invention, what I claim as new, and desire to secure by Letters Patent, is—

A sprinkling attachment for brooms comprising a reservoir mounted on said broom, a tube mounted in said reservoir and projecting through the bottom part thereof, said tube having communication with the interior of said reservoir, a valve for regulating the flow of liquid from said reservoir into said tube, and tubes connected to the outer end of said tube and extending beyond the sides of said reservoir and extended down the edges of the broom and having portions thereof bent horizontally and parallel to the plane of the broom and having perforations in the upper sides thereof for the escape of the liquid on the strands of the broom.

In testimony whereof I set my hand, in the presence of two witnesses, this 22d day of March, 1904.

JAMES P. TAYLOR.

Witnesses:
J. S. NOEL,
EDGAR HENRY.